Oct. 4, 1955 P. J. SCHIEFER 2,719,438
ENGINE FLYWHEEL
Filed Nov. 22, 1952

*INVENTOR.*
PAUL J. SCHIEFER
BY
*Knox & Knox*
AGENTS

United States Patent Office 2,719,438
Patented Oct. 4, 1955

2,719,438
ENGINE FLYWHEEL
Paul J. Schiefer, La Mesa, Calif.

Application November 22, 1952, Serial No. 322,073

1 Claim. (Cl. 74—572)

The present invention relates generally to a flywheel and more particularly to an engine flywheel and the method of making same. In automobiles, clutch plates are pressed against the flywheel of the engine for the purpose of transmitting power to the transmission and wheels. Internal combustion engines, when installed in an automobile, do not require a large or heavy flywheel, but tremendous amounts of heat are generated everytime a clutch is engaged (as when changing gears) and with each frequently occurring change in load or torque. Unless the heat thus generated is rapidly dissipated, the various elements of the clutch and the flywheel itself become weak, warped or deformed and lose their efficiency. Steel wear rings have been riveted on to automobile engine flywheels to provide a friction facing, but these rings absorb and hold the heat, can dissipate such heat only through the spaced rivets, and as a result such rings are not at uniform temperatures during use, warp and deform and are not satisfactory.

The present invention is directed to an automotive engine flywheel which is provided with a thermally and mechanically stable clutch friction ring, the construction permitting the ring to rapidly and uniformly transmit its heat to the flywheel. The invention utilizes metals and alloys of high and low density and of differing specific heats and heat conductivities, so that a light-weight flywheel can be used without the disadvantages of prior constructions.

The primary object of this invention is to provide an engine flywheel of the type used in automotive vehicles in which the clutch face of said flywheel is fitted with a hard metal clutch friction ring to reduce wear on said clutch face of flywheel.

Another object of this invention is to provide a flywheel of the type described which is made of aluminum or similar metal, the hard metal clutch friction ring being fabricated in the clutch face of said flywheel by a metal spraying process.

Another object of this invention is to provide a flywheel which has the capacity to dissipate heat generated by friction at a high rate so that distortion and scoring is prevented.

Another object of this invention is to provide a flywheel which is inexpensive and practicable to manufacture.

Finally, it is an object to provide a flywheel of the aforementioned character which will give generally efficient and durable service.

With these and other objects definitely in view, this invention consists in the novel construction, combination and arrangement of elements and portions, as will be hereinafter fully described in the specification, particularly pointed out in the claim, and illustrated in the drawing which forms a material part of this disclosure and wherein similar characters of reference indicate similar or identical elements and portions throughout the specification and throughout the views of the drawing, and in which:

Figure 1:
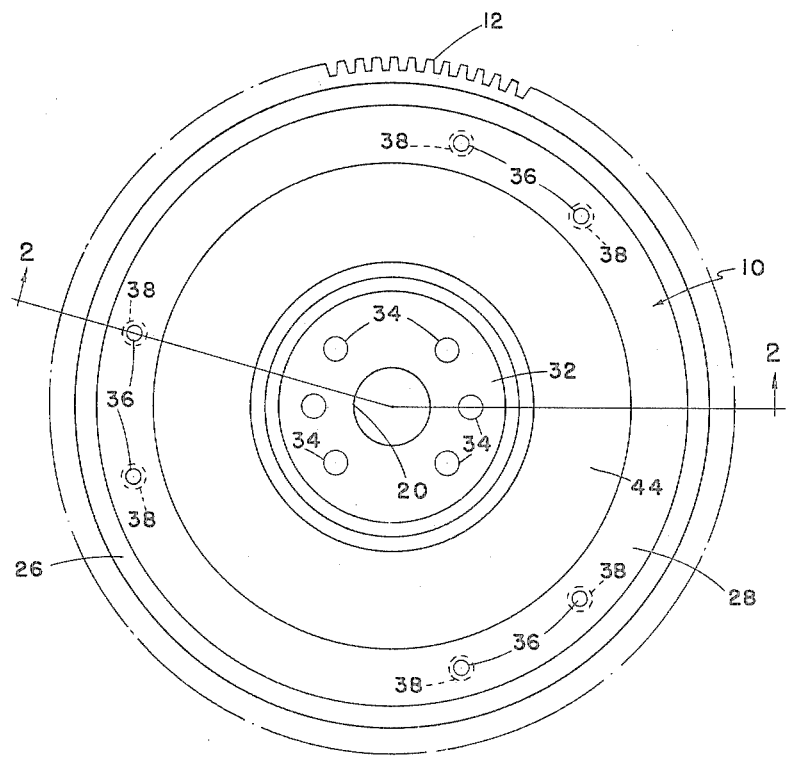
Fig. 1 is a side elevation view of the flywheel.
Figure 2:
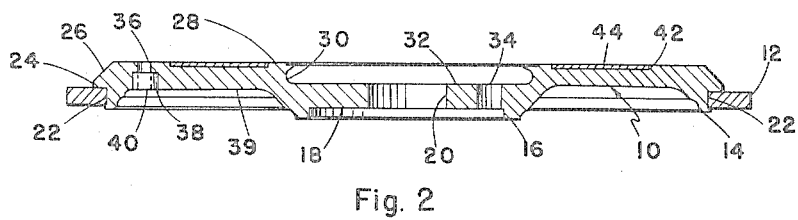
Fig. 2 is a sectional view taken on the line 2—2 of Fig. 1.

Referring now to the drawing in detail, the flywheel comprises a flywheel casting 10 of aluminum or similar metal fitted with a steel ring gear 12. The flywheel casting 10 is produced by one of a number of well known methods and requires certain machining operations to complete the finished product, the details of which will now be described. It is not considered essential to this disclosure to illustrate or describe in detail the various parts of the engine associated with the flywheel and referred to in the following description, the functions of such parts being well known to those skilled in the art.

The flywheel casting 10 is inserted in a suitable lathe for the preliminary operations which consist of facing the rim 14 and the hub 16. The recess 18 is now machined to accommodate the flange of the engine crankshaft, and the hole 20 is bored and reamed to receive the pilot bearing. Finally, the ring groove 22 is machined to fit the ring gear after which the flywheel casting 10 may be turned to allow the other face to be machined.

The next operation is to machine the rim 24 and cut the edge chamfer 26, after which the entire clutch face 28 is rough faced. The undercut 30 and the hub face 32 are now machined following which the partially completed flywheel may be removed from the lathe for the drilling operations. First the holes 34 are drilled to match the crankshaft dowels and bolts, then the holes 36 and the counterbores 38 are drilled in the web portion 39, said counterbores being of the correct diameter to provide a force fit for the hardened inserts 40. The inserts are provided with external serrations or ribs extending axially of the inserts and the inserts are fitted after the foregoing machining operations are completed.

These hardened inserts 40 are internally screw threaded to fit the pressure plate cap screws, thus eliminating the necessity for screw threads in the flywheel casting itself, which, if made of aluminum or the like, would not possess the strength necessary to withstand any excessive strains imposed on the screw threads.

Following the drilling operations, the ring gear 12 is heated and shrunk into the ring groove 22. The contraction of the ring gear 12 tends to distort the flywheel casting 10 very slightly so said flywheel casting is replaced in the lathe and the clutch face 28 is once more rough faced. At this stage the casting is undercut to provide a recess 42 for the clutch friction ring 44. The metal on the surface of the undercut or recess 42 is roughened and torn to present an uneven bonding surface for the metalizing mentioned below, after which the flywheel is removed from the lathe once more.

The clutch friction ring 44 is composed of a sprayable metal having considerable hardness, toughness and excellent wearing qualities, and is built up in the recess 42 by means of a metal spraying process, the details of which are well known to those skilled in the art. It should be noted that the considerable heat produced in this process is quickly dissipated due to the extremely small size of the metal particles falling into the recess 42, thus eliminating any distortion of the flywheel.

After the spraying process is completed, the flywheel is again placed in the lathe and the clutch face 28 is finish faced, following which the now completed flywheel is balanced by drilling holes where required in the edge chamfer 26.

In recapitulation, the flywheel comprises a flywheel casting 10 having a rim 14, a hub 16 and a web portion 39 between said rim and said hub. The hub 16 is provided with a recess 18 concentric with said hub and the rim 14, and a hole 20 centrally located in the flywheel casting 10. The rim 14 has a circumferential ring groove 22 to accommodate the ring gear 12 which is heated and shrunk in position to grip the flywheel casting firmly. The ring gear 12 rests against the rim 24 produced by cutting the ring groove 22 in the rim 14, the rim 24 having a chamfer 26. The clutch face 28, which includes the entire face of the flywheel casting remote from the hub 16, is provided with an undercut 30, the hub face 32 at the bottom of said undercut having drilled therein a plurality of holes 34 extending through the hub 16 into the recess 18. The flywheel casting 10 is further provided with a plurality of holes 36 drilled in the web portion 39 on the side remote from the clutch face 28. The counterbores 38 are made to receive the hardened inserts 40 which are internally screw threaded, their external surfaces having serrations which are pressed firmly into the metal surrounding said counterbores when said inserts are forced into position, thus preventing said inserts from rotating.

The clutch face 28 is undercut to provide a recess 42, said recess comprising a concentric ring positioned between the undercut 30 and the rim 24. The recess 42 is filled with a tough wear resistant metal by means of a metal spraying process to provide the clutch friction ring 44, which must necessarily have excellent wearing qualities to withstand the pressures exerted thereon by the pressure plate of the clutch mechanism. It will be noted that the wear-resistant ring has its entire back face in intimate, bonded contact with the flywheel, thereby permitting heat generated in the ring to be quickly and evenly dissipated to the flywheel.

In this way it is possible to use a flywheel of aluminum or other suitable light material to gain higher performance from the engine to which such a flywheel is fitted, and yet retain the wear resistant qualtities of a heavier, harder flywheel. The metal used for the clutch friction disc may even be such that the wearing qualtities are better than those of a heavier flywheel, so eliminating the necessity for repeated resurfacing of the clutch face as may be required if the flywheel is subjected to excessively hard use. Aluminum and its alloys are of low density, but high heat content per pound and are not wear resistant; sprayable metals, such as bronze or leaded bronzes, have high density, high thermal conductivity, high wear resistance and coefficients of expansion compatible with aluminum and its alloys.

The operation of this invention will be clearly comprehended from a consideration of the foregoing description of the mechanical details thereof, taken in connection with the drawing and the above recited objects. It will be obvious that all said objects are amply achieved by this invention.

Further description would appear to be unnecessary.

It is understood that minor variation from the form of the invention disclosed herein may be made without departure from the spirit and scope of the invention, and that the specification and drawing are to be considered as merely illustrative rather than limiting.

I claim:

A flywheel for automotive engines comprising: a hub, a rim portion and a disc-like web having a flat surface between the hub and rim portion and integral therewith, said hub, rim and web being of a lightweight aluminum metal; a ring gear carried by the rim portion and a thin, flat, annular friction ring of hard, wear-resisting metal carried by the face of such web, the rear surface of said friction ring being in intimate, bonded, substantially continuous contact with the web.

References Cited in the file of this patent

UNITED STATES PATENTS

| Number | Name | Date |
|---|---|---|
| 848,593 | Hatfield | Mar. 26, 1907 |
| 953,634 | Morgan | Mar. 29, 1910 |
| 1,767,309 | Ricardo | June 24, 1930 |
| 1,947,493 | Rose et al. | Feb. 20, 1934 |
| 1,998,666 | Frank | Apr. 23, 1935 |
| 2,346,732 | Crawford et al. | Apr. 18, 1944 |
| 2,519,865 | Wellman | Aug. 22, 1950 |

FOREIGN PATENTS

| Number | Country | Date |
|---|---|---|
| 569,963 | Great Britain | June 15, 1945 |